0
United States Patent Office 3,383,393
Patented May 14, 1968

3,383,393
NOVEL 7-ALKYL-19-NOR-STEROIDS
Hendrik Paul de Jongh, Oss, Netherlands, assignor to Organon Inc., West Orange, N.J., a corporation of New Jersey
No Drawing. Filed Nov. 13, 1964, Ser. No. 411,109
Claims priority, application Netherlands, Nov. 20, 1963, 300,774
1 Claim. (Cl. 260—397.5)

The invention relates to novel 7-alkyl-19-nor-steroids and to a process for the preparation thereof.

More particularly, the invention relates to the novel 3-unsubstituted-19-nor-steroids of the general formula:

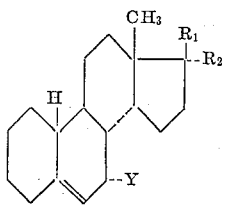

wherein

Y=an alkyl group,
$R_1$=OH or OAcyl,
$R_2$=hydrogen or a saturated or unsaturated hydrocarbon radical with 1–4 carbon atoms, or
$R_1+R_2$=together a keto group.

The present compounds are very important on account of their progestative, anabolic, androgenic, oestrogenic, gonad-inhibiting and ovulation-inhibiting properties. Particularly the compounds having in 17-position an unsaturated alkyl group exert a strong ovulation-inhibiting activity.

The compounds according to the invention can be prepared by starting from a compound of the general formula:

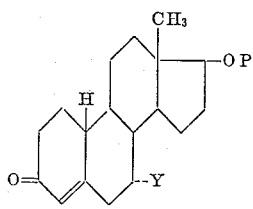

wherein

Y=an alkyl group, and
P=an ester or ether group, saponifying less readily than the 3-acyl group to be introduced, converting this compound in a known manner into the corresponding 3-enolacylate, followed by the reduction of the double bond between the carbon atoms 3 and 4 and by conversion of the 3-hydroxyl compound into the corresponding 3-halogen derivative by halogenation, after which of the thus obtained $\Delta^5$-3-halogen-compound the 3-halogen substituent is split off reductively, followed, if desired, by the introduction of the substituents in 17-position as indicated in the above formula, by hydrolisation into the free 17-hydroxy compound, oxidation into the corresponding 17-keto-compound, alkylation by an addition reaction with a hydrocarbon metal derivative at the 17-keto group to obtain the corresponding 17-hydroxy-17α-alkyl-compound, and/or esterification of the 17-hydroxyl group to obtain the corresponding 17-esters thereof.

A further object of this invention is to provide the novel intermediates of the general formula:

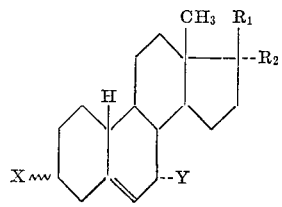

wherein

X=a halogen atom,
Y=an alkyl group,
$R_1$=OH or OAcyl,
$R_2$=hydrogen or a saturated or unsatured hydrocarbon radical with 1–4 carbon atoms, or
$R_1+R_2$=together a keto group.

These compounds are useful as intermediates for the preparation of the corresponding 3-unsubstituted 19-nor-steroids mentioned before, but are also valuable end-products on account of their anabolic, androgenic, progestative, gonad-inhibiting, oestrogenic and ovulation-inhibiting properties.

The preparation of these compounds takes place in the same way as described above for the preparation of the 3-unsubstituted compounds omitting the reductive splitting off of the 3-halogen substituent.

The starting products to be used in the process according to the present invention are described e.g., in "Steroids," vol. 1, p. 317 (1963), or can be prepared therefrom by esterification or etherification of the respective 17-hydroxy-compound.

The ether or ester group present in 17-position in the starting-product is generally a group that is less readily saponified than the 3-enolester group introduced in the first step of the present process. As examples of protecting groups to be used are mentioned an ether group, such as tertiary butyl ether group and a tetrahydropyranyl ether group, or an ester such as a carbonate, a trimethyl acetate or a benzoate.

The 3-enolacylation of the starting product may be performed by any method known per se, e.g., by reaction with an acyl chloride and a carboxylic acid anhydride in the presence of an organic base, such as pyridine, or with a carboxylic acid anhydride and an acid catalyst, such as p-toluene sulphonic acid or dinitro benzene sulphonic acid.

The subsequent reduction of the double bond between the carbon atoms 3 and 4 of the $\Delta^{3,5}$-3-acyloxy compound obtained can be performed by means of an alkali metal borohydride, such as sodium borohydride. In this reduction the 3-acyloxy group is simultaneously converted into a 3-hydroxy group.

The reduction is performed in a suitable organic solvent, usually in the presence of water. As examples of suitable solvents are mentioned: lower aliphatic alcohols, such as methanol, ethanol, propanol or t-butanol, an aliphatic ether, such as dimethylether, diethylether or methyl ethyl ether, and further dioxane or tetrahydrofurane.

Next the 3-hydroxyl group is replaced by a halogen atom. This conversion can be performed by treatment with, e.g., phosphor trichloride, phosphor pentachloride, thionyl chloride, phosphor oxychloride, phosphor tribromide, phosphor pentabromide or thionyl bromide.

For preference the 3-hydroxy compound is converted into the 3-chloro compound, for which conversion thionyl chloride is usually applied.

Of the thus obtained $\Delta^5$-3-halogen-7α-alkyl compound the 3-halogen group can first be split off, after which modifications may be introduced in the steroid in 17-position. But it is also possible to introduce the latter modifications in the steroid without splitting off the 3-halogen group dependent upon the desired final product.

The 3-halogen group can be split off by reduction. This reduction can be performed by treating the 3-halogen steroid with an alkali metal in the presence of a primary amine or liquid ammonia and also by reduction with an alkali metal and an alcohol, e.g., sodium/ethanol, or with Raney nickel in the presence of an alcohol, e.g., ethanol. For preference an alkali metal in liquid ammonia is used for the reduction.

Next the $\Delta^5$-7α-alkyl-17β-hydroxy-19-nor-androstene compound obtained by the process of the invention can be converted in a known manner into the corresponding 17-keto, or 17-hydroxy-17α-alkyl-steroids by oxidation, followed, if desired, by an addition reaction with a hydrocarbon-metal derivative.

The 17-hydroxyl group is oxidized in a known manner, for example, by the Oppenauer method or with chromium trioxide.

The alkylation in 17-position can be performed by adding a metal derivative of a saturated or unsaturated hydrocarbon to the 17-keto group of the relative compound. The metal derivative may be a Grignard compound, e.g., the magnesium bromide of the relative hydrocarbon or an alkyl lithium compound. A special performance for the preparation of the 17 - hydroxy-17α-alkynyl compounds consists in that the 17-keto-steroid is reacted with a triple unsaturated hydrocarbon in the presence of an alkali metal or an alkali metal compound, such as an alkali metal amide or alkali metal alcoholate, or by the addition of a metal compound of a triple unsaturated hydrocarbon, such as an alkali metal or alkaline earth metal compound, to the 17-keto group of the starting product. As equivalent to the processes described above, hence falling under the patent rights, must be regarded the method for the preparation of the desired 17-hydroxy-17α-alkyl or alkenyl compounds in which first the 17-keto-steroid is converted into a 17-hydroxy-17α-alkynyl or 17-alkenyl compound by an addition reaction, after which this compound is converted into the corresponding 17-alkenyl or 17-alkyl compound by reduction, for instance, by means of hydrogen in the presence of a catalyst, such as nickel or Pd/BaSO$_4$. This route is mostly more favourable than the method in which the addition takes place at once, because the addition reaction with a metal derivative of a triple unsaturated hydrocarbon usually gives a better yield than the addition reaction with an alkane or alkene metal derivative.

The hydrocarbon radical possibly present in the final products in 17-position may be e.g., a methyl, ethyl, propyl, butyl, isopropyl, vinyl, propenyl, allyl, methallyl, ethynyl, propynyl, propargyl or butynyl radical.

The secondary or tertiary 17-hydrory-steroids prepared by the processes described above may be esterified, if desired. In the esterification inorganic acids, such as phosphoric acids, or saturated or unsaturated organic carboxylic acids with 1–30 carbon atoms may be applied.

The preparation of these esters may take place by any method known per se by reaction of the 17-hydroxy steriod with the relative acid or the anhydride or halide thereof.

As examples of organic carboxylic acids to be used in the esterification are mentioned: formic acid, acetic acid, propionic acid, butyric acid, valeric acid, capric acid, undecylic acid, lauric acid, tridecylic acid, myrstic acid, pentadecylic acid, oleic acid, palmitic acid, stearic acid, arachic acid, behenic acid, lignoceric acid, cerotic acid, mentanic acid, myricinic acid, trimethyl acetic acid, di-ethyl acetic acid, hexahydrobenzoic acid, cyclopentyl propionic acid, cyclohexyl butyric acid, cyclohexyl propionic acid, citronellic acid, undecylenic acid, erucic acid, benzoic acid, phenyl acetic acid, phenyl propionic acid, phenyl butyric acid, phenyl propiolic acid, malonic acid, succinic acid, glutaric acid, pimelic acid and tartaric acid.

The compounds according to the invention may be administered parenterally or orally in the form of suspensions, solutions, emulsions or solid pharmaceutical dosage unit forms, usually after mixing with auxiliaries or, if desired, other active components.

The invention is further illustrated by the following examples:

EXAMPLE 1

In 14 ml. of pyridine are dissolved 4.9 g. of 7α-methyl-19-nor-testeosterone, after which 3.3 ml. of benzoyl chloride are added at a temperature of 0° C. Next the mixture is kept at room temperature for 18 hours and after that poured into 130 ml. of ice water, in which 3.5 g. of sodium carbonate are dissolved. The aqueous mixture is extracted with ether, washed with 15% sulphonic acid, next with a sodium carbonate solution and finally with water until neutral. After drying over sodium sulphate the ether solution is evaporated in vacuo and the residue recrystallized a few times from a mixture of methylene chloride and methanol to obtain the 7α-methyl-19-nor-testosterone-17-benzoate ( melting point: 172–173° C.).

Of this compound 5 g. are dissolved in 80 ml. of acetic anhyride, 32 ml. of acetic chloride and 3.2 ml. of pyridine, after which this mixture is refluxed for 3 hours. Next the solution is cooled down a little and evaporated to a small volume, after which the residue is taken up in a mixture of 50 ml. of ethanol and 0.5 ml. of pyridine.

After that this mixture is evaporated to dryness and the residue recrystallized from ethanol/pyridine to obtain the 3-enolacetate of 7α-methyl-19-nor - testosterone-17 - benzoate (U.V. $\lambda_{max}$=235 m$\mu$; $\epsilon$=26,000).

To a solution of 4.5 g. of this substance in 70 ml. of tetrahydrofurane and 140 ml. of 96% ethanol a solution of 4.5 g. of sodium borohydride in 90 ml. of 70% ethanol is next added at room temperature, after which the reaction mixture is decomposed with dilute hydrochloric acid after cooling down to 0° C. The mixture is evaporated in vacuo to a small volume to obtain a white crystalline precipitate of the $\Delta^5$-7α-methyl-3β,17β-dihydroxy - oestrene-17-benzoate (U.V. $\lambda_{max}$=m$\mu$; $\epsilon$=12,000).

Four grams of this compound are dissolved in 10 ml. of methylene chloride after which 4 ml. of thionyl chloride are added dropwise. The mixture is kept at room temperature for 3 hours and next poured out into ice water. The aqueous mixture is extracted with methylene chloride and the extract washed with a solution of sodium bicarbonate and next chromatographed over 100 g. of silicagel (eluent petroleum ether/benzene 1:1) to obtain the $\Delta^5$-7α-methyl - 3β - chloro-17β-hydroxy-oestrene-17-benzoate (U.V. $\lambda_{max}$=230.5 m$\mu$; $\epsilon$=11,000).

Of this substance 5.5 g. are dissolved in 150 ml. of methanol and 50 ml. of dioxane after which 3 g. of potassium hydroxyde in 10 ml. of water are added. The mixture is refluxed for 3 hours and next evaporated in vacuo to a small volume, poured into water, extracted with methylene chloride, washed with water, dried and evaporated to dryness. After chromatography over silicagel the $\Delta^5$-3β-chloro-7α-methyl-17β-hydroxy-oestrene is obtained.

EXAMPLE 2

Four grams of $\Delta^5$-3β-chloro-7α-methyl-17β-hydroxy-oestrene are dissolved in 6 ml. of pyridine, after which a solution is added of 2.5 ml. of benzene and 0.5 ml. of phenyl propionic acid chloride at −5° C. The mixture is kept at 4° C. for 15 hours and next poured out into ice water, extracted with ether, washed with 10% sulphuric acid, water, 1 N sodium hydroxide and finally again with water until neutral. The extract is dried and evaporated to dryness in vacuo, after which the residue is chromatographed over silicagel to obtain the 17-phenyl propionate of $\Delta^5$-3$\beta$-chloro-7$\alpha$-methyl-17$\beta$-hydroxy-oestrene.

In the same manner the 17-esters can be prepared, derived from valeric acid, isocaproic acid, capric acid, lauric acid and stearic acid.

EXAMPLE 3

By the process described in Example 2, the 17-acetate is obtained of $\Delta^5$-3$\beta$-chloro-7$\alpha$-methyl-17$\beta$-hydroxy-oestrene by using acetic anhydride. In the same manner can be prepared the 17-propionate, the 17-caprylate and the 17-succinate.

EXAMPLE 4

Two grams of $\Delta^5$-3$\beta$-chloro-7$\alpha$-methyl-17$\beta$-hydroxy-oestrene are dissolved in 40 ml. of acetone after which 2.2 ml. of a solution of 8 N chromic acid according to Jones are added. The mixture is stirred for 10 minutes at —5° C., next 5 ml. of methanol are added, after which the mixture is evaporated in vacuo to a small volume, poured out into water, extracted with chloroform, washed with 1 N sodium hydroxide and water until neutral. After drying and evaporation to dryness chromatography takes place over silicagel to obtain the $\Delta^5$-3$\beta$-chloro-7$\alpha$-methyl-17-keto-oestrene.

EXAMPLE 5

Acetylene gas is bubbled through a solution of 3.5 g. of potassium in 20 ml. of aqueous isopropanol and 60 ml. of benzene at 0° C. Next a solution is added of 6 g. of $\Delta^5$-3$\beta$-chloro-7$\alpha$-methyl-17-keto-oestrene in 30 ml. of benzene and 30 ml. of ether after which again acetylene gas is bubbled through. The mixture is stirred for 12 hours at room temperature, after which a solution is added of 10% sulphuric acid and 40 ml. of water in nitrogen atmosphere. The mixture is extracted with ether, washed, dried and evaporated to dryness in vacuo, after which the residue is chromatographed over silicagel to obtain the $\Delta^5$-3$\beta$-chloro-7$\alpha$-methyl-17$\beta$-hydroxy-17$\alpha$-ethynyl-oestrene.

To a solution of 2.3 g. of this compound in 15 ml. of pyridine are added 4.1 g. of acetic anhydride, whereupon the solution is stirred for 8 hours at 35° C. after the addition of 20 ml. of water the mixture is stirred for 2 hours and next extracted with ether after the addition of 100 ml. of water. The ether extract is washed with 2 N hydrochloric acid, next with 1 N sodium hydroxyde, after that dried on sodium sulphate and finally evaporated to dryness. The residue is recrystallised from methanol to obtain the 17-acetate of the $\Delta^5$-3$\beta$-chloro-7$\alpha$-methyl-17$\beta$-hydroxy-17$\alpha$-ethynyl-oestrene.

In the same manner are prepared the valerate, trimethyl acetate and the 17$\beta$-phenylpropionate.

EXAMPLE 6

To a solution of 1 g. of $\Delta^5$-3$\beta$-chloro-7$\alpha$-methyl-17$\beta$-hydroxy-17$\alpha$-ethinyl-oestrene in 25 ml. of ethyl acetate is added 0.1 g. of pre-hydrated Pd on carbon (5%) in 10 ml. of ethyl acetate. After taking up about 140 ml. the mixture is filtered off, washed with ethyl acetate, evaporated to dryness in vacuo and chromatographed over silicagel to obtain the $\Delta^5$-3$\beta$-chloro-7$\alpha$-methyl-17$\beta$-hydroxy-17$\alpha$-ethyl-oestrene.

EXAMPLE 7

By the process described in Example 5 the $\Delta^5$-3$\beta$-chloro-7$\alpha$-methyl-17$\beta$-hydroxy-17$\alpha$-ethyl-oestrene is converted into the 17-esters derived from acetic acid, caproic acid, capric acid, $\beta$-phenyl propionic acid and palmitic acid.

EXAMPLE 8

To a solution of allyl magnesium bromide, prepared by the addition of a mixture of 8 g. of magnesium and 150 ml. of ether to a solution of 12 ml. of allyl bromide in 12 ml. of ether, is added a solution of 2.69 g. of $\Delta^5$-3$\beta$-chloro-7$\alpha$-methyl-17-keto-oesrene in 165 ml. of ether at 0° C. and in nitrogen atmosphere. Next the reaction mixture is stirred for 5 hours at 0° C. and after that kept at room temperature for one night. The resulting Grignard compound is next decomposed with 10% sulphuric acid at 0° C., the ether layer is separated, washed with water, dried on sodium sulphate, evaporated in vacuo to dryness and chromatographed over 150 g. of silicagel (eluent: a mixture of benzene and ether 4:1) to obtain the $\Delta^5$-3$\beta$-chloro-7$\alpha$-methyl-17$\beta$-hydroxy-17$\alpha$-allyl-oestrene.

This compound has been converted into the corresponding 17-esters derived from acetic acid, butyric acid, $\beta$-phenyl propionic acid and oleic acid.

EXAMPLE 9

A solution of 6 g. of $\Delta^5$-3$\beta$-chloro-7$\alpha$-methyl-17$\beta$-hydroxy-oestrene-17-benzoate in 120 ml. of absolute ether is added to a solution of 6 g. of lithium in 170 ml. of liquid ammonia. The mixture is stirred for 1½ hours, whereupon 60 ml. of 96% ethanol are added, the ammonia is evaporated and the residue diluted with ice water. The aqueous mixture is extracted with ether, washed with water until neutral, dried, evaporated to dryness in vacuo and chromatographed over silicagel to obtain 4.1 g. of $\Delta^5$-7$\alpha$-methyl-17$\beta$-hydroxy-oestrene.

EXAMPLE 10

By the process described in Example 4 the $\Delta^5$-7$\alpha$-methyl-17$\beta$-hydroxy-oestrene has been converted into the corresponding 17-keto compound.

One gram of this compound, dissolved in 10 ml. of ether, is added to 30 ml. of a Grignard solution, prepared by adding dropwise 9 ml. of allyl bromide in 9 ml. of ether to a mixture of 7.5 g. of magnesium in 105 ml. of absolute ether. The thus obtained mixture is stirred for 2½ hours at room temperature in nitrogen atmosphere, after which it is poured into ice water acidified with hydrochloric acid. The aqueous mixture is extracted with ether, washed with water until neutral, dried, evaporated in vacuo to dryness and chromatographed over 200 g. of silicagel to obtain the $\Delta^5$-7$\alpha$-methyl-17$\alpha$-allyl-17$\beta$-hydroxy-oestrene.

This compound has been converted in a known manner into the 17-acetate, 17-isocaproate, 17-oenanthate, 17$\beta$-phenyl propionate and 17-stearate.

EXAMPLE 11

In the same manner as described in Example 5 the $\Delta^5$-7$\alpha$-methyl-17-keto-oestrene has been converted into the corresponding 17$\alpha$-ethinyl compound.

Of this compound 2.1 g. dissolved in 60 ml. of ethyl acetate are added to a mixture of 200 mg. of pre-hydrated 5% Pd-BaSO$_4$ in 6 ml. of ethyl acetate. Hydrogen is bubbled through the solution till 2 mol H$_2$ has been taken up.

Next the hydration is interrupted, the solution filtered and evaporated to dryness. The residue is recrystallized from ethanol to obtain the $\Delta^5$-7$\alpha$-methyl-17$\beta$-hydroxy-17$\alpha$-ethyl-oestrene.

If the hydration is interrupted after 1 mol of hydrogen has been taken up, the $\Delta^5$-7$\alpha$-methyl-17$\beta$-hydroxy-17$\alpha$-vinyl is obtained.

The above-mentioned compounds have been converted in a known manner into the corresponding 17-esters derived from acetic acid, capric acid, $\beta$-phenyl propionic acid, lauric acid and palmitic acid.

EXAMPLE 12

A solution of 1 g. of $\Delta^5$-7$\alpha$-methyl-17-keto-oestrene in 50 ml. of absolute ether is slowly added to a solution of 6.2 g. of butenyl magnesium bromide in 50 ml. of ether. The mixture is refluxed for 2 hours, then cooled and subsequently treated with a 10% solution of tartaric acid in water. The ether layer is separated, washed with water, dried on sodium sulphate, and then evaporated to dryness.

The residue is recrystallized from a mixture of acetone and petroleum ether to yield Δ⁵-7α-methyl-17β-hydroxy-17α-butenyl-oestrene.

Esterification of this compound yielded the 17-esters derived from acetic acid, valeric acid and β-phenylpropionic acid.

By replacing butenyl magnesium bromide by propargyl magnesium bromide or methallyl magnesium chloride the corresponding 17β-hydroxy-17α-propargyl-, and 17β-hydroxy-17α-methallyl compounds have been prepared.

I claim:
1. A compound selected from the group consisting of Δ⁵-7α-methyl-17β-hydroxy-17α-ethynyl-oestrene and the 17-acylates thereof.

References Cited

UNITED STATES PATENTS 3,262,949    7/1966   Ringold et al.

FOREIGN PATENTS 996,308    6/1965   Great Britain.
615,712    9/1962   Belgium.

OTHER REFERENCES

Campbell et al., "Steroids" (1963) vol. 1, pp. 317–324.

ELBERT L. ROBERTS, *Primary Examiner.*
LEWIS GOTTS, *Examiner.*